United States Patent [19]

Tang

[11] Patent Number: 5,483,437
[45] Date of Patent: Jan. 9, 1996

[54] POWER SUPPLY ARRANGEMENT FOR NOTEBOOK COMPUTERS

[75] Inventor: Kuang-Chang Tang, Taoyuan Hsien, Taiwan

[73] Assignee: Chicony Electronics, Co., Ltd., Taipei, Taiwan

[21] Appl. No.: 410,925

[22] Filed: Mar. 27, 1995

[51] Int. Cl.⁶ .......................... H02M 1/00; H01M 10/44; G06F 1/00
[52] U.S. Cl. ..................... 363/146; 320/2; 364/708.1
[58] Field of Search ..................... 363/142, 144, 363/146; 364/492, 707, 708.1; 320/2, 15; 307/48, 66; 365/226, 228, 229

[56] References Cited

U.S. PATENT DOCUMENTS

| | | | |
|---|---|---|---|
| 4,998,055 | 3/1991 | Nash et al. | 320/2 |
| 5,200,685 | 4/1993 | Sakamoto | 320/2 |
| 5,239,495 | 8/1993 | Nanno et al. | 364/707 |
| 5,327,067 | 7/1994 | Scholder | 320/2 |
| 5,335,192 | 8/1994 | Oshiba | 364/708.1 |
| 5,383,140 | 1/1995 | Nano et al. | 364/708.1 |
| 5,420,493 | 5/1995 | Hargadon | 320/15 |

*Primary Examiner*—Matthew V. Nguyen
*Attorney, Agent, or Firm*—Merchant, Gould, Smith, Edell, Welter & Schmidt

[57] ABSTRACT

A power supply arrangement including a bottom shell for a notebook computer which has two battery chambers and a power input socket, at least one battery set for insertion into the battery chambers respectively to provide the notebook computer with DC power supply, an adapter for converting AC power supply into DC power supply for the notebook computer, and a power connector for connecting the adapter to the power input socket on the bottom shell of the notebook computer, wherein the adapter can be directly installed in one battery chamber to electrically connected to the power supply circuit of the notebook computer or externally connected to the power input socket on the bottom shell of the notebook computer by the power connector.

1 Claim, 10 Drawing Sheets

POWER SUPPLY ARRANGEMENT FOR NOTEBOOK COMPUTERS

BACKGROUND OF THE INVENTION

The present invention relates to the power supply arrangement of notebook computers, and relates to such a power supply arrangement which includes a battery set installed in the bottom shell of the notebook computer and an adapter for installation in the bottom shell of the notebook computer for converting AC power supply to DC power supply, wherein the adapter can be removed from the notebook computer to spare a space for loading an additional battery set, and can also be externally connected to the power input socket of the notebook computer by a power connector.

Notebook computers have become more and more popular for the advantages of mobility and versatility. Because notebook computers commonly use battery power supply, they can be used anywhere when desired. However, the battery of a notebook computer cannot keep the notebook computer working for long. In order to eliminate this problem, some notebook computer manufacturers directly install an adapter in the notebook computer for converting AC power supply into DC power supply. However, the weight of the notebook computer will be greatly increased when a AC to DC adapter is installed.

SUMMARY OF THE INVENTION

According to one aspect of the present invention, the power supply arrangement comprises a bottom shell for a notebook computer which has two battery chambers and a power input socket, at least one battery set for insertion into the battery chambers respectively to provide the notebook computer with DC power supply, an adapter for converting AC power supply into DC power supply for the notebook computer, and a power connector for connecting the adapter to the power input socket on the bottom shell of the notebook computer, wherein the adapter can be directly installed in one battery chamber to electrically connected to the power supply circuit of the notebook computer or externally connected to the power input socket on the bottom shell of the notebook computer by the power connector. According to another aspect of the present invention, the power connector comprises two parallel side wings for connection to the two lateral sides of the adapter, two hooked portions respectively raised from the side wings for fastening to two opposite side retaining holes on the adapter, an electric connector for connection to the electric connector on the rear side of the adapter, a T-bar at a back side, and an electric cable wound round said T-bar and having one end fixedly connected to the electric connector of the power connector and an opposite end for connection to the power input socket of the notebook computer.

DETAILED DESCRIPTION OF THE PREFERRED EMBODIMENT

Figure 1:
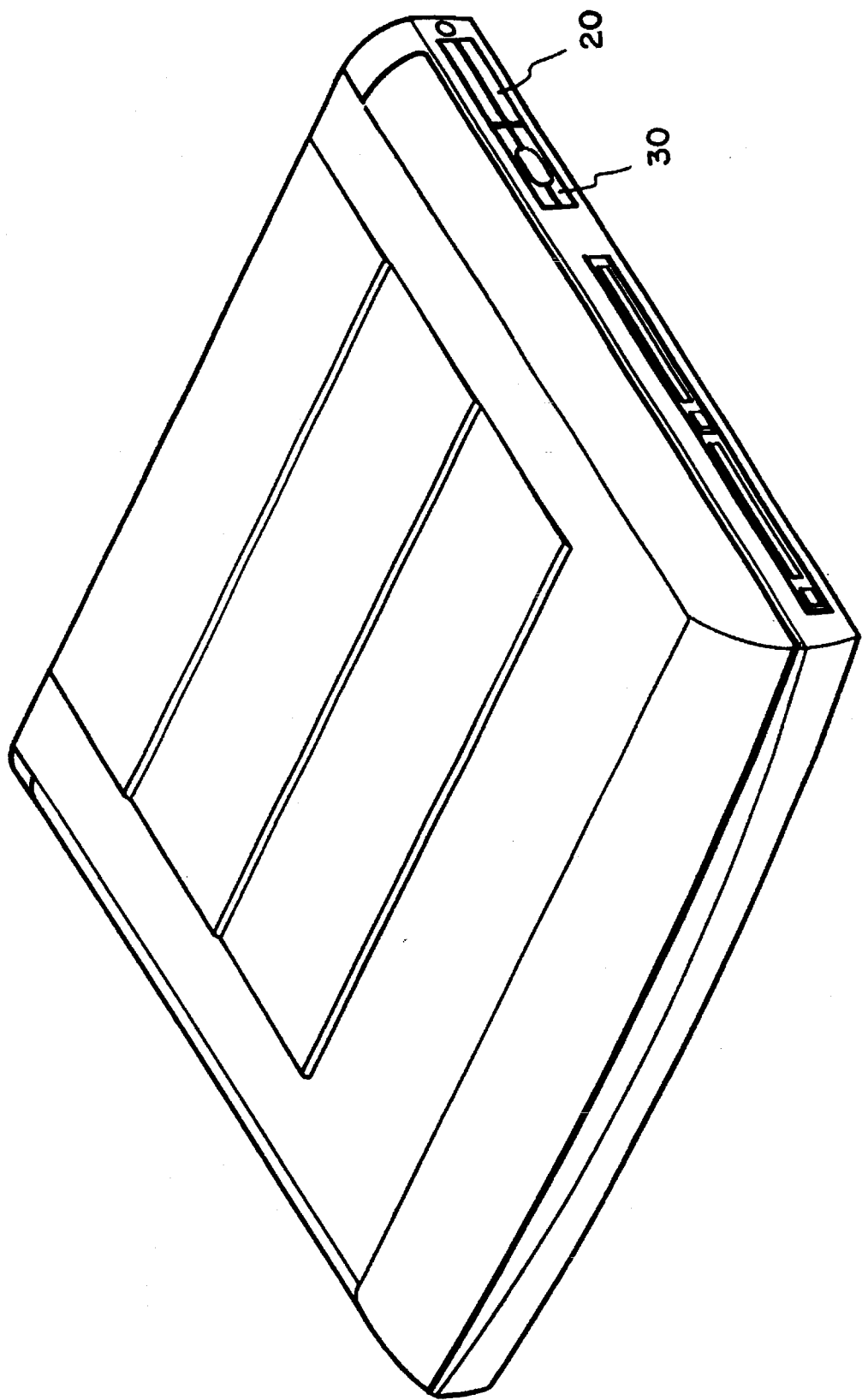
FIG. 1 is an elevational view of a notebook computer according to the present invention.
Figure 2:
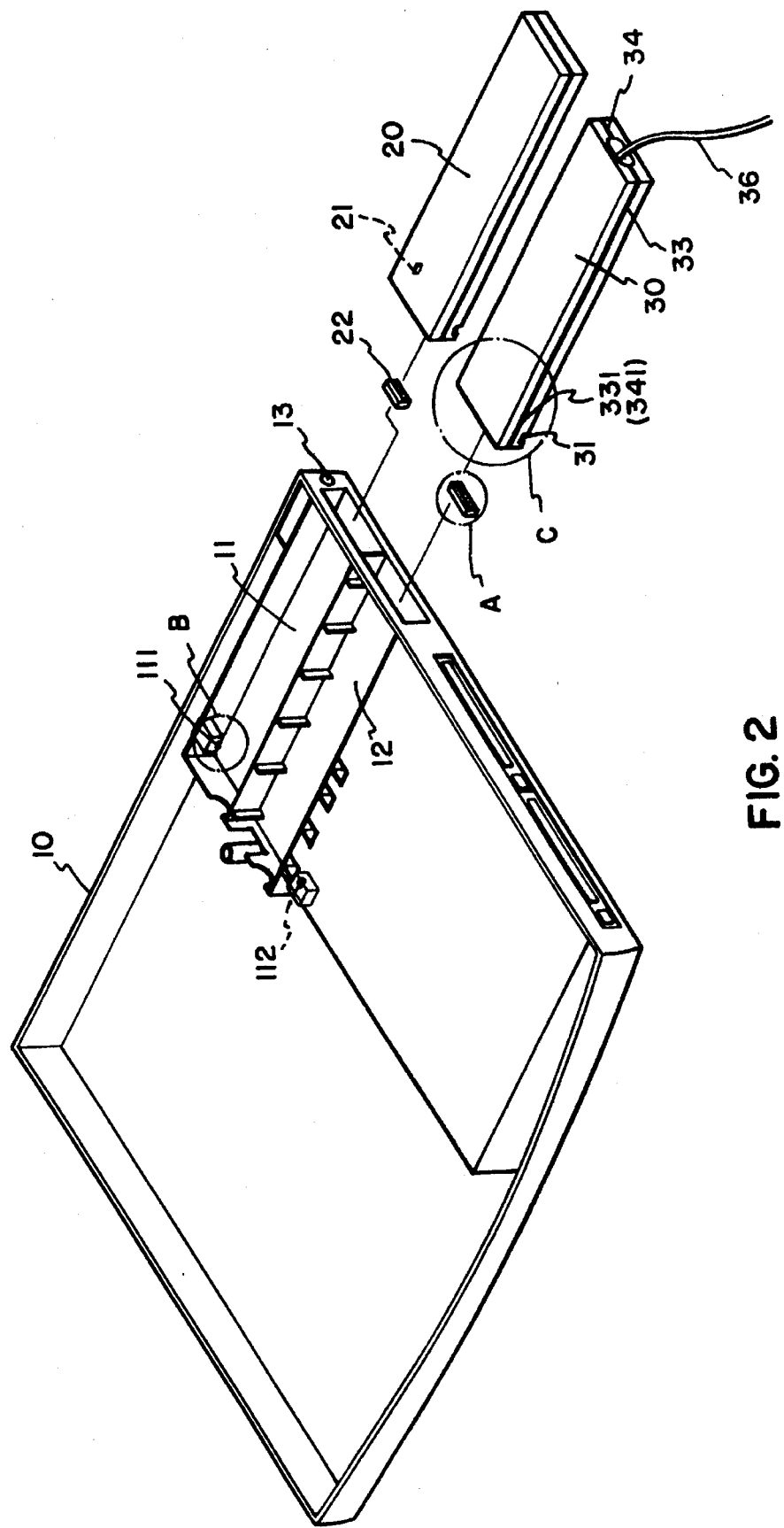
FIG. 2 is an exploded view of one power supply arrangement according to the present invention.
Figure 2A:
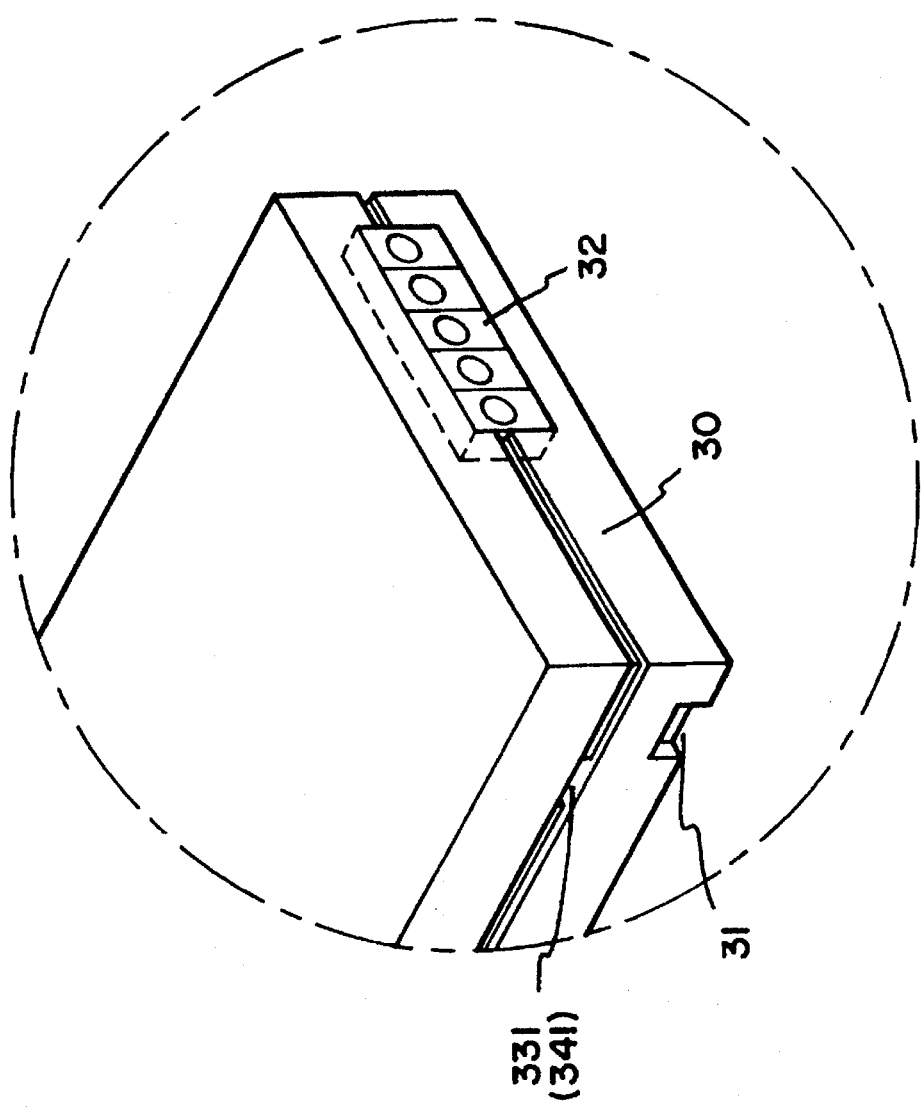
FIG. 2A is a perspective view in an enlarged scale taken on part A of FIG. 2.
Figure 2B:
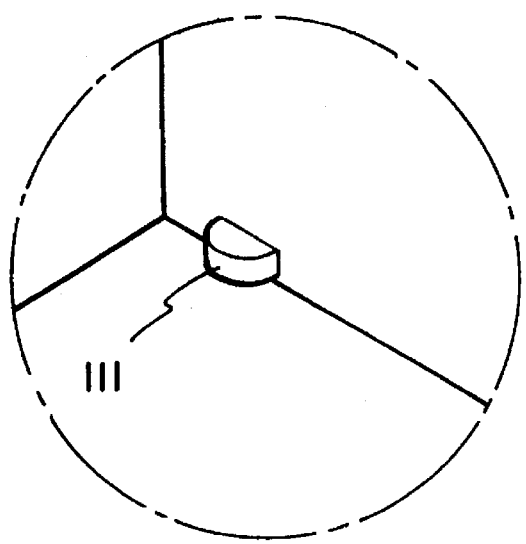
FIG. 2B is a perspective view in an enlarged scale taken on part B of FIG. 2.
Figure 2C:
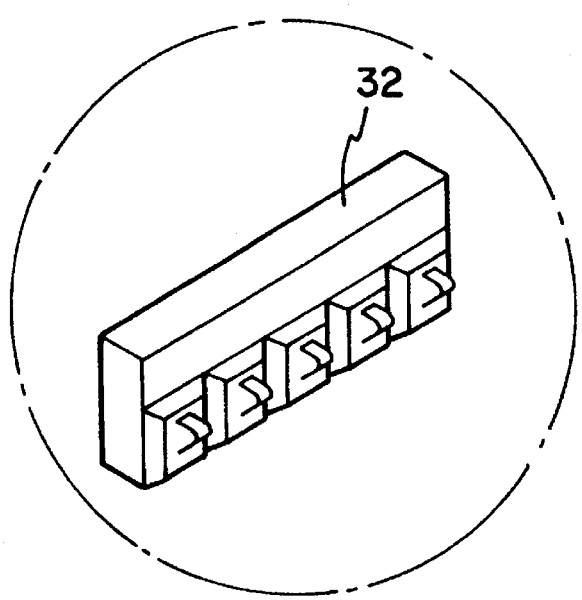
FIG. 2C is a perspective view in an enlarged scale taken on part C of FIG. 2.
Figure 3:
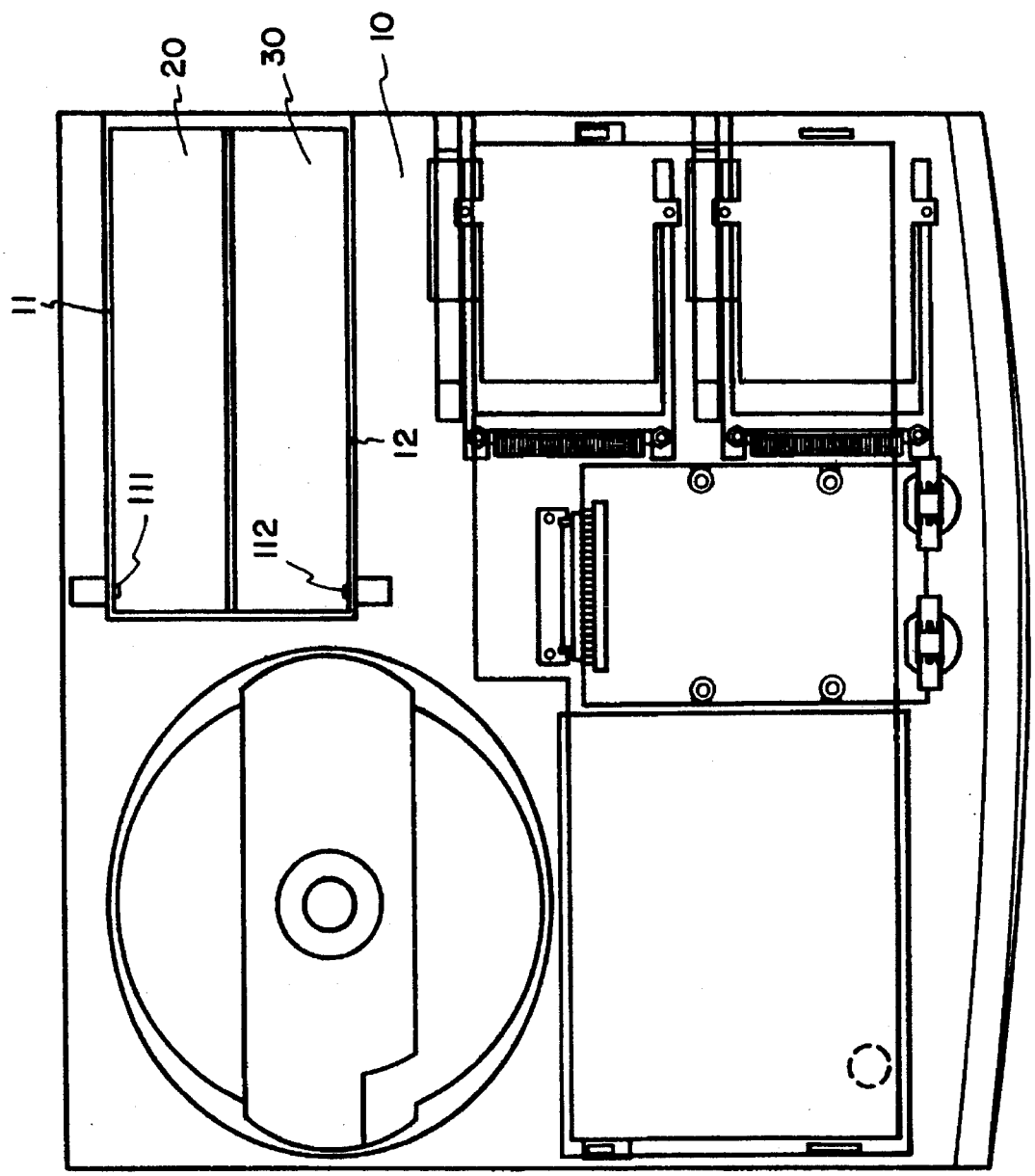
FIG. 3 is a top plain view of the notebook computer shown in FIG. 1.
Figure 4:
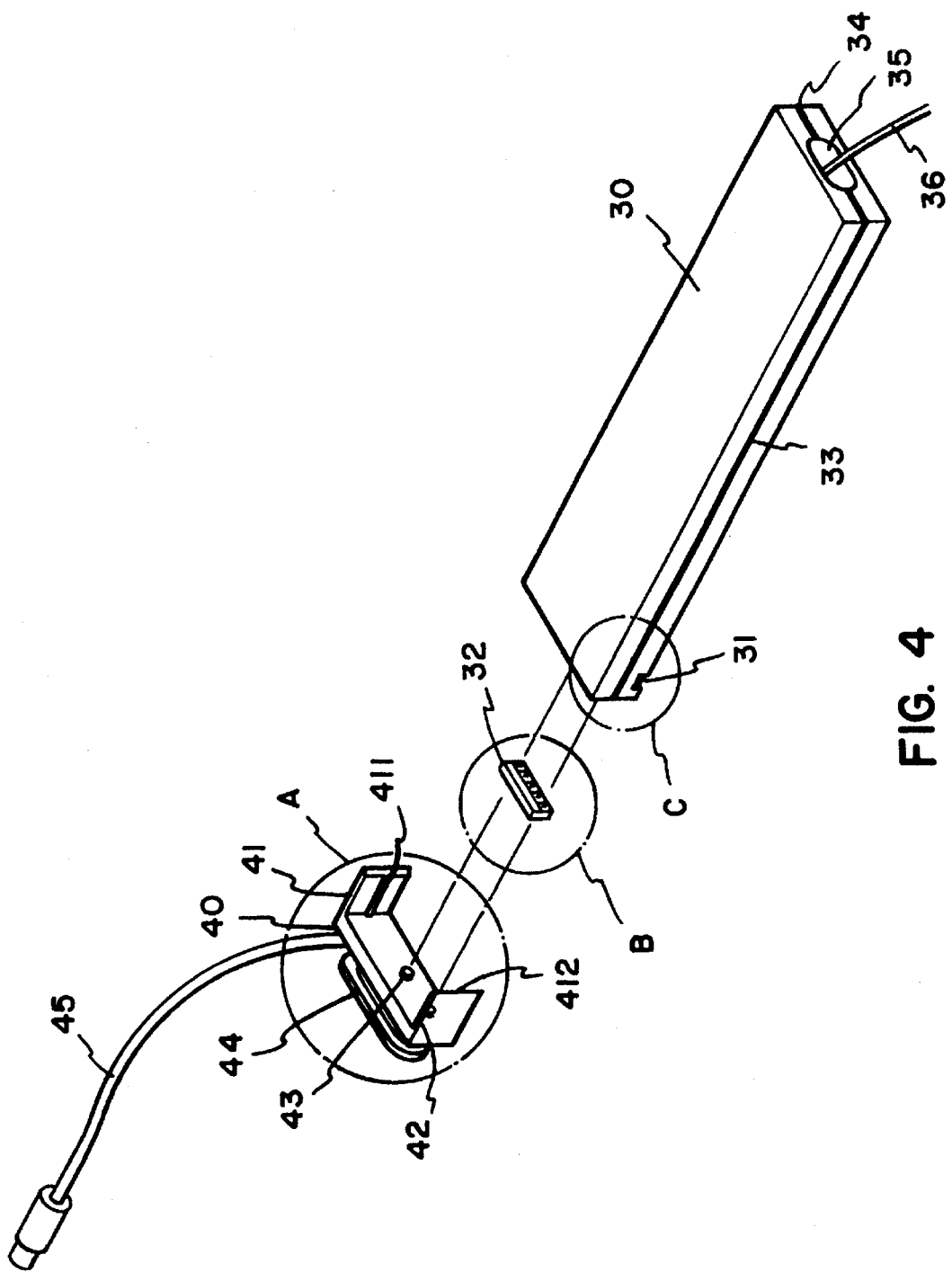
FIG. 4 is an exploded view of an adapter and a power connector according to the present invention.
Figure 4A:
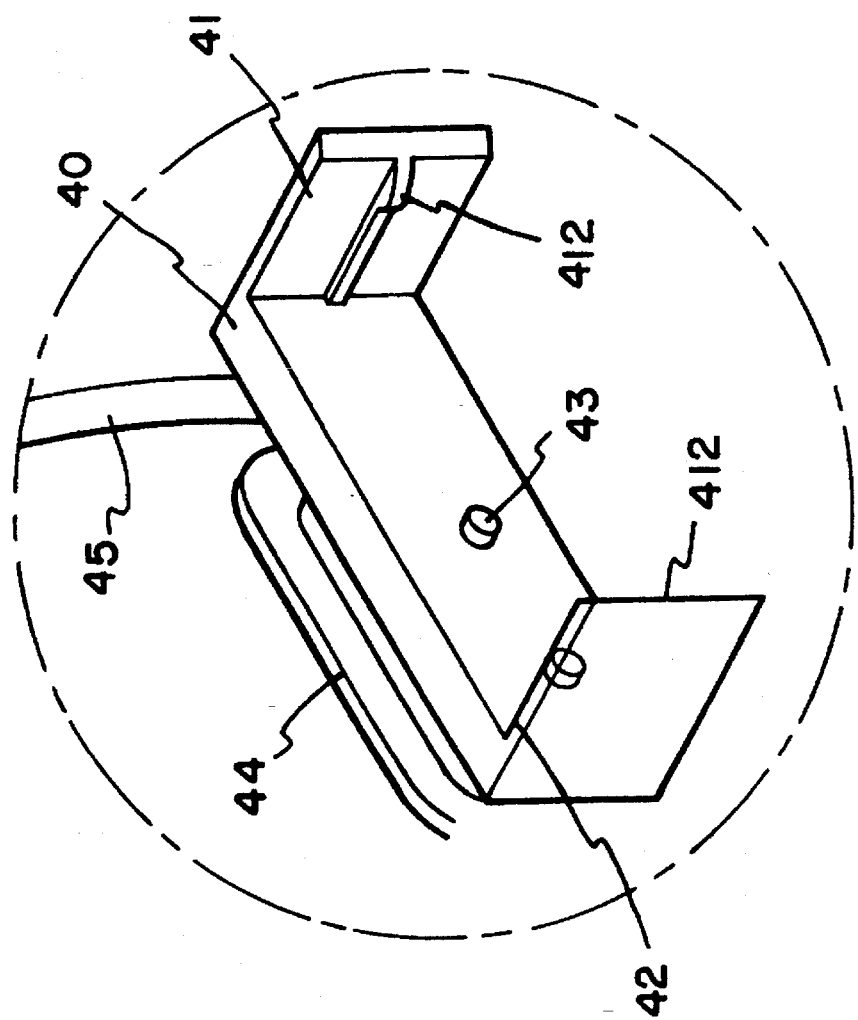
FIG. 4A is an enlarged view taken on part A of FIG. 4.
Figure 4B:
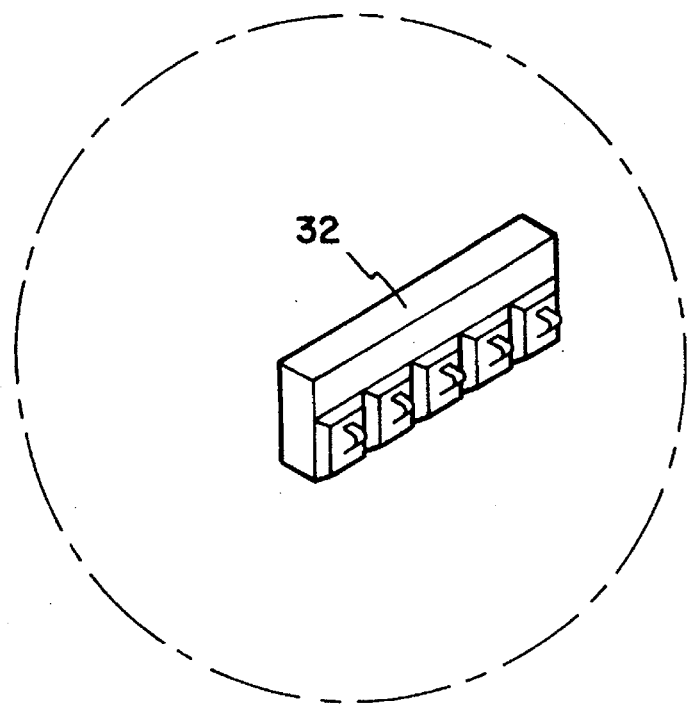
FIG. 4B is an enlarged view taken on part B of FIG. 4.
Figure 4C:
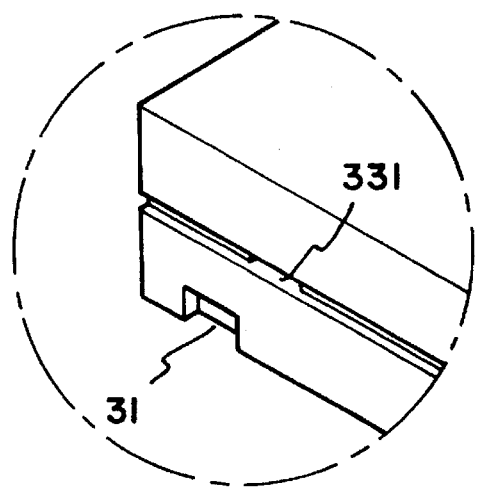
FIG. 4C is an enlarged view taken on part C of FIG. 4.

Referring to FIGS. 1, 2, 3, and 4, the bottom shell 10 of the notebook computer comprises two symmetrical battery chambers 11 and 12 for holding a battery set 20 and an AC to DC converting adapter 30 (or for holding two battery sets 20), and two retaining rods 111 and 121 respectively disposed within the battery chambers 11 and 12 at a rear side. The battery set 20 and the adapter 30 have a respective retaining hole 21 or 31 at one laterally side near the rear end for engagement with the retaining rod 111 or 121, and a respective electric connector 22 or 32 for connection to the power supply circuit of the notebook computer. The adapter 30 further comprises two longitudinal tracks 33 and 34 along two opposite long sides thereof, two retaining holes 331 and 341 respectively made on the longitudinal tracks 33 and 34 in the middle for mounting a power connector 40, and a power cable 36 extended out of a front hole 35 thereof for connection to city power supply. The power connector 40 comprises two parallel side wings 41 and 42 having two hooked portions 411 and 422 respectively raised from the parallel side wings 41 and 42 at an inner side, an electric connector 43 for connection to the electric connector 32 on the adapter 30, a T-bar 44 at the back side, and an electric cable 45 wound round the T-bar 44 and fixedly connected to the electric connector 43 for connection to the power input socket 13 on the bottom shell 10 of the notebook computer. By inserting the hooked portions 411 and 422 through the longitudinal tracks 33 and 34 into the retaining holes 331 and 441, the power connector 40 is fastened to the adapter 30 with the electric connectors 43 and 32 electrically connected.

Figure 5:
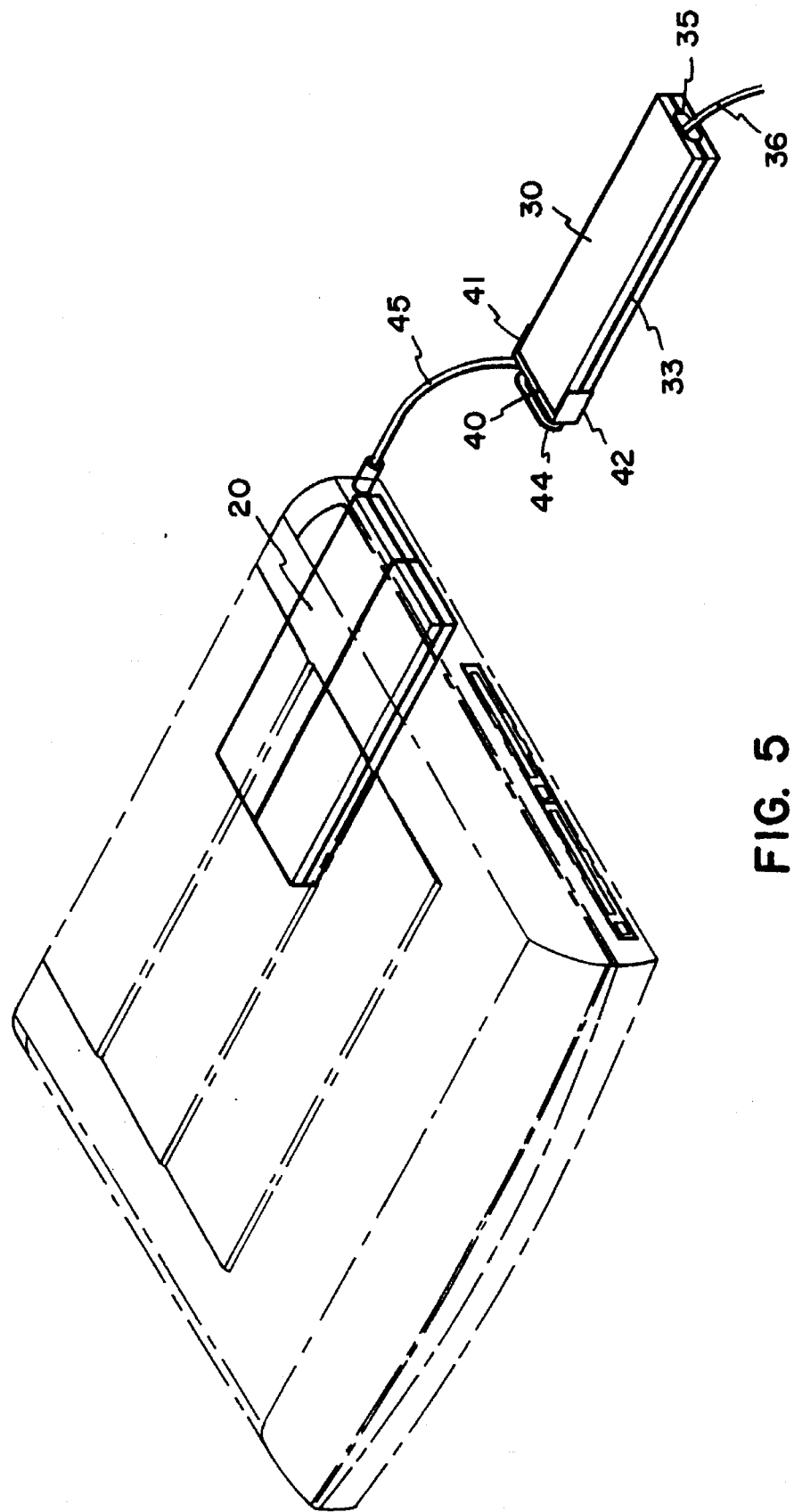
FIG. 5 is an applied view showing one arrangement of the present invention.

Referring to FIG. 5 and FIG. 2 again, two battery sets 20 can be installed in the battery chambers 11 and 12 of the notebook computer, and the adapter 30 can be connected to the power input socket 13 of the notebook computer by the power connector 40 for converting AC power supply into DC power supply for the notebook computer.

Figure 6:
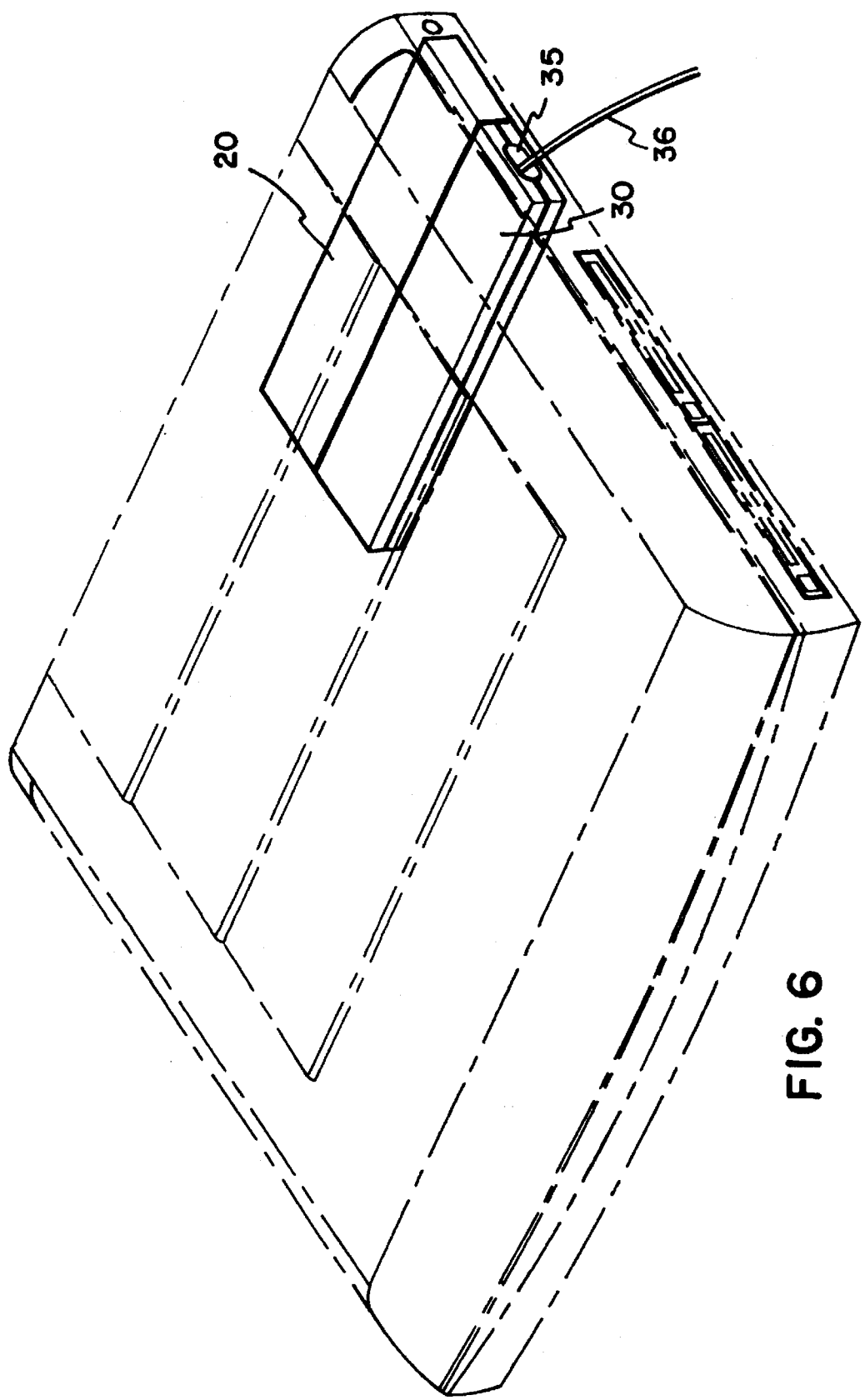
FIG. 6 is an applied view showing another arrangement of the present invention.

Referring to FIG. 6 and FIG. 1 again, one battery set 20 and one adapter 30 can be respectively installed in the battery chambers 11 and 12 of the notebook computer, and the power cable 36 of the adapter 30 can be connected to city power supply so that the adapter 30 can convert AC power supply into DC power supply for the notebook computer.

It is to be understood that the drawings are designed for purposes of illustration only, and are not intended as a definition of the limits and scope of the invention disclosed.

What is claimed is:

1. A power supply arrangement comprising:
   a bottom shell for a notebook computer, said bottom shell having two adjacent battery chambers and a power input socket, each battery chamber having at least one retaining rod;

at least one battery set for installation in said battery chambers respectively to provide DC power supply to the notebook computer, said at least one battery set having a retaining hole for engagement with the retaining rod in the battery chamber in which said at least one battery set is installed, and an electric connector for connection to a power supply circuit of the notebook computer;

an adapter for converting AC power supply into DC power supply, said adapter comprising an electric connector at a rear end thereof for connection to the power supply circuit of the notebook computer, a power cable at a front end thereof for connection to a city power supply outlet, two longitudinal tracks at two opposite lateral sides thereof, and two retaining holes respectively made on said longitudinal tracks; and a power connector for connecting the electric connector of said adapter to the power input socket of the notebook computer, said power connector comprising two parallel side wings for connection to the two lateral sides of said adapter, two hooked portions respectively raised from said side wings for insertion through said longitudinal tracks into the retaining holes on said longitudinal tracks, an electric connector for connection to the electric connector on said adapter, a T-bar at a back side of said power connector, and an electric cable wound round said T-bar and having one end fixedly connected to the electric connector of said power connector and an opposite end for connection to the power input socket of the notebook computer.

* * * * *